United States Patent [19]

Nevill, Jr. et al.

[11] Patent Number: 4,748,672
[45] Date of Patent: May 31, 1988

[54] INDUCED VIBRATION DYNAMIC TOUCH SENSOR SYSTEM AND METHOD

[75] Inventors: Gale E. Nevill, Jr., Gainesville, Fla.; Robert W. Patterson, Houston, Tex.

[73] Assignee: University of Florida, Gainesville, Fla.

[21] Appl. No.: 723,644

[22] Filed: Apr. 16, 1985

[51] Int. Cl.$^4$ ............................ G06K 9/00; G01D 5/34
[52] U.S. Cl. .......................................... 382/1; 340/710; 382/58; 901/33; 901/46
[58] Field of Search ................... 382/1, 3, 58; 901/33, 901/46, 47; 414/5; 73/570, 584; 623/25, 15, 24, 57, 64; 84/DIG. 24; 178/18

[56] References Cited

U.S. PATENT DOCUMENTS

| | | | |
|---|---|---|---|
| 3,618,019 | 11/1969 | Nemirovsky | 178/18 |
| 3,883,146 | 5/1975 | Johnson et al. | 369/177 |
| 3,956,598 | 5/1976 | Kawakami et al. | 369/136 |
| 4,122,435 | 10/1978 | Greenaway | 382/3 |
| 4,200,921 | 4/1980 | Buckley | 901/46 |
| 4,303,914 | 12/1981 | Page | 340/710 |
| 4,308,522 | 12/1981 | Paganini et al. | 382/3 |
| 4,414,984 | 11/1983 | Zarudiansky | 901/46 |
| 4,521,685 | 6/1985 | Rebman | 901/33 |
| 4,550,316 | 10/1985 | Whetstone et al. | 340/710 |
| 4,588,348 | 5/1986 | Beni et al. | 901/46 |

Primary Examiner—Leo H. Boudreau
Attorney, Agent, or Firm—Dennis P. Clarke

[57] ABSTRACT

An induced vibration dynamic touch sensor comprises a compliant membrane adapted for sliding contact with an object so as to induce vibrations in the membrane, and a transducer assembly for converting the vibrations into electrical signals. The electrical signals are processed to produce a normalized spectral signature characteristic of the size and shape of the object, and the sizes and shapes and nature of its surface features. A pattern vector is extracted from the spectral signature and subjected to discriminant analysis to classify and recognize the object. The invention is capable of discriminating between objects differing in diameter by as little as 1/32 inches and differing in spacing by as little as 0.01 inches.

25 Claims, 2 Drawing Sheets

INDUCED VIBRATION DYNAMIC TOUCH SENSOR SYSTEM AND METHOD

BACKGROUND OF THE INVENTION

This invention relates to tactile or touch sensor systems and methods particularly, although not exclusively, adapted for use with robotic devices and the like.

Robotics is rapidly becoming a major industry, and robotic devices are being used increasingly for such diverse purposes as manufacturing, assembly, metal forming and inspection, as well as in remote or hazardous environments. Although present generation robots are primarily preprogrammed to perform very specific tasks, major research efforts are underway to develop intelligent robots which are capable of reacting to changing environments and circumstances, and capable of imitating, to some extent, human functions and operations. This necessitates that a robot be capable of sensing its environment, and tactile or touch sensing is an important requirement for such purposes.

Early approaches to tactile sensing employed microswitches or binary pressure sensitive pads which provided little more than contact information. More recent approaches have employed proportional sensing elements typically arranged in an array or strategically located on the surface of a gripper to enable recognition of an object's shape and orientation. For the most part, tactile sensors are still primarily pressure sensitive or proximity sensitive devices, and known tactile sensors have a number of disadvantages.

It is recognized that a principal need for the next generation of robots is improved tactile sensing capable of providing continuously variable touch sensing over an area within which there is spatial resolution. Tactile sensor development in the past has been directed largely to improving transduction techniques and to increasing the spatial density of sensing arrays. The most commonly used transducer materials are conductive elastomeric, piezoresistive, or piezoelectric materials. Conductive elastomers have problems with nonlinearity, fatigue and nonrepeatability. Piezoresistive elements, although sensitive, linear and reliable, have a high per unit cost and poor spatial distribution limitations. Flexible piezoelectric polymers have attractive touch sensing possibilities and the advantages of being rugged, lightweight, and having good linearity and hysteresis characteristics, but their principal drawback is a lack of a DC response, thus necessitating the use of special signal capture techniques. Improving spatial density of sensor arrays requires smaller sensors, and there have been some efforts to develop smaller sensors.

It is desirable to provide improved touch sensor systems and methods which avoid these and other disadvantages of known systems and methods, and it is to this end that the present invention is directed.

SUMMARY OF THE INVENTION

The invention is based upon a new dynamic sensing concept which exploits active, sliding motion of the sensor to provide information characteristic of an object and its features. Sensor apparatus in accordance with the invention is simple, inexpensive and rugged, capable of providing outputs faster than current approaches, and is more versatile in determining surface textures, feature configurations, and precise feature locations and orientations. Moreover, sensor apparatus in accordance with the invention is adaptable to a wide range of operating conditions.

The invention is based upon the concept that relative sliding motion between a sensor and an object produces vibrations which are characteristic of the object and its features, and that these vibrations may be analyzed and interpreted to determine the character of the object. This is somewhat analogous to the manner in which humans detect the character of an object by rubbing their finger across it. Vibrations induced in the skin of the finger are transmitted to the brain where they are interpreted and correlated with familiar patterns.

Broadly, in one aspect, the invention provides sensor apparatus comprising a membrane, means for producing sliding contact between the membrane and an object to induce vibrations in the membrane, transducer means for sensing the vibrations and for producing an electrical signal corresponding to the vibrations, and means for deriving from the electrical signal a pattern characteristic of the object.

In another aspect, the invention provides sensor apparatus comprising a membrane, and first and second transducers. Each transducer comprises a thin layer of uniaxially oriented piezoelectric material having a greater sensitivity to strains applied in one direction than in other directions, the first transducer being affixed to a surface of the membrane and the second transducer being affixed to the first transducer such that the directions of greater sensitivity of the two transducers extend in different directions.

In yet another aspect, the invention affords a sensing method comprising producing sliding contact between a membrane and an object to induce vibrations in the membrane, sensing the vibrations in the membrane and producing an electrical signal, and deriving from the electrical signal a pattern characteristic of the object.

DESCRIPTION OF THE PREFERRED EMBODIMENTS

The invention is particularly well adapted for use with robots and other forms of mechanical manipulators, such as prosthetic devices, and will be described in that context. However, as will become apparent, the invention has greater utility.

As noted above, the invention contemplates producing relative sliding contact between a sensor and an object being sensed so as to induce vibrations in the sensor which are a function of the character of the object being sensed. As used herein, the character of an object means its size and shape, the sizes and shapes of surface features, patterns of features, orientations of features, surface texture, and feature dimensions and spacings. As will be described more fully shortly, the electrical signals may be processed and analyzed using statistical analysis techniques to enable recognition of the object and/or its character. First, however, improved sensors in accordance with the invention will be described.

Figure 1:
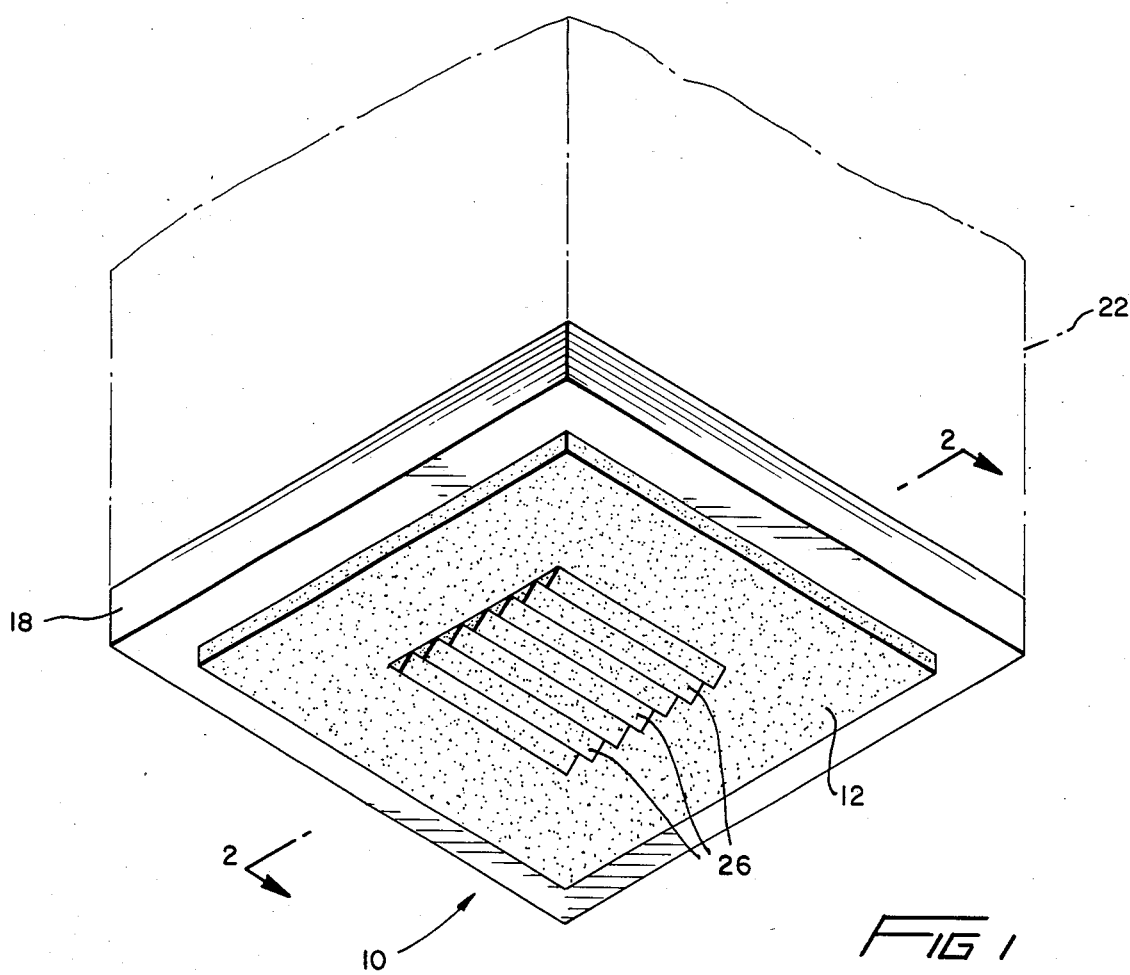
FIG. 1 is a perspective view of an improved touch sensor in accordance with the invention.
Figure 2:
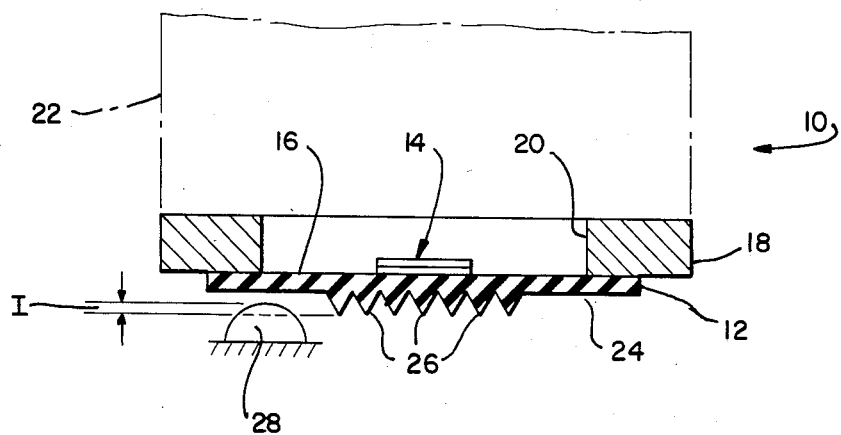
FIG. 2 is a cross sectional view of the sensor of FIG. 1 taken approximately along the lines 2—2.
Figure 3:
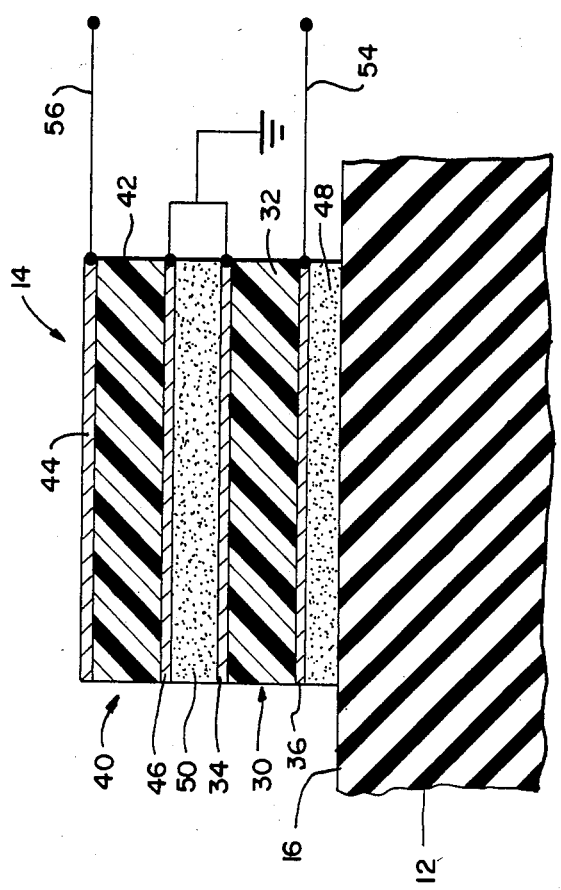
FIG. 3 is an enlarged cross sectional view of a portion of the sensor of FIG. 2 illustrating an improved transducer assembly.

FIGS. 1-3 illustrate one form of an improved induced vibration dynamic touch sensor 10 in accordance with the invention. As shown, sensor 10 may comprise a compliant skin or membrane 12 having a transducer assembly 14 mounted on one surface 16 thereof. The membrane may be mounted on a plate or member 18 having an aperture or opening 20 therein so as to extend across the opening and such that the transducer assembly is disposed within the opening. Plate 18 may be further connected to a suitable holder or mount 22 formed to enable the sensor to be positioned appropriately with respect to an object to be sensed and to afford relative sliding contact between the sensor and the object. Holder 22 may be a portion of a gripper, for example, of a mechanical manipulator which is adapted to either move relative to a stationary or moving object or to be held fixed with respect to a moving object.

As shown, the opposite, outwardly facing surface 24 (the lower surface in FIGS. 1 and 2) of the membrane may have disposed thereon a plurality of protrusions 26. The protrusions may be irregularly shaped and irregularly disposed on surface 24, or, as shown in FIGS. 1 and 2, may comprise a plurality of regularly spaced parallel extending prism-shaped ridges centrally located on surface 24. The purpose of the protrusions is to enhance the vibrations induced in the membrane as a result of sliding contact between the membrane and an object 28 being sensed, although the membrane may also be formed with a smooth contacting surface. Membrane 12 may comprise silicone rubber, for example, and protrusions 26 may be formed integrally with the membrane, as by molding the membrane with the protrusions. Alternatively, the protrusions may be formed separately and connected to the membrane, and the protrusions may be of a different material. For example, the protrusions may comprise an abrasion-resistant material, such as glass beads, which is particularly advantageous for sensing abrasive objects.

As best illustrated in FIG. 2, opening 20 in plate 18 is preferably sized so that the membrane is supported on the plate only about the peripheral edges of the membrane so that the greatest portion of the membrane, which extends across the opening, may vibrate unobstructedly. Opening 20 may have generally the same shape as membrane 12, i.e., substantially square as shown, but slightly smaller dimensions than the membrane. The membrane may be connected to the plate by any suitable adhesive, for example, such as epoxy. Membrane 12 may have dimensions of the order, for example, of 1 inch by 1 inch by 0.06 inches. The ridges 26 may have a length of the order of 0.5 inches, depend 0.04 inches from surface 24, and be 0.065 inches wide at their base. As shown in FIG. 2, the transducer assembly 14 is further from the object than the membrane 12 is. The membrane 12 and transducer assembly 14 are commonly supported by the plate 18, the assembly 14 being supported by way of membrane 12.

Transducer assembly 14 may comprise one or more sensing or tranducer elements which convert the vibrations induced in the membrane into corresponding electrical signals. The sensing elements may be piezoelectric transducers, and each preferably comprises a planar piece of metallized polyvinylidene fluoride (PVDF) film (a piezoelectric polymer) which is uniaxially oriented so that it has maximum sensitivity in one direction, i.e., it has a greater sensitivity to dynamic strains applied in the direction of orientation. Accordingly, the transducer primarily provides unidirectional information.

FIG. 3 illustrates in more detail a preferred form of a transducer assembly 14 in accordance with the invention. As shown, the transducer assembly may comprise a first transducer 30 comprising a PVDF polymer film 32 having upper and lower (in the figure) metallized surfaces 34 and 36, respectively, and a second transducer 40 comprising a PVDF polymer film 42 having metallized surfaces 44 and 46. Transducer 30 may be bonded or fixed to surface 16 of membrane 12 by a layer 48 of suitable adhesive, such as epoxy, and transducer 40 may be bonded or fixed on top of transducer 30 by another layer of epoxy 50. The transducers are preferably oriented with respect to one another so that their directions of maximum sensitivity are orthogonal and such that the directions of maximum sensitivity of the two transducers extend, respectively, parallel and normal to the direction of ridges 26. Transducer 30, for example, may have its direction of maximum sensitivity normal to the ridges (i.e., in the plane of FIG. 2), in which case transducer 40 would have its direction of maximum sensitivity parallel to the ridges (i.e., normal to the plane of FIG. 2). The adjacent metallized layers 34 and 46 of the two transducers may be connected together electrically and to ground, as shown in FIG. 3, and the outputs of the two transducers may be taken from electrical leads 54 and 56 connected to metallized layers 36 and 44, respectively, as shown. Thus, the output signal of transducer 30 on lead 54 primarily comprises information related to the vibrations in the membrane normal to ridges 26, and the output signal on lead 56 of transducer 40 primarily comprises information related to vibrations parallel to the ridges.

The PVDF layers of the two transducers may have a thickness of the order of 52 microns, for example, and each transducer may have dimensions of the order of 0.2 inches by 0.2 inches. As shown in FIG. 2, the transducer assembly 14 and the ridges 26 are both preferably centrally disposed on opposite surfaces 16 and 24, respectively, of the membrane.

The transducer assembly configuration illustrated in FIG. 3 corresponds to that of a prototype sensor which has been constructed with a ridge pattern such as shown in FIGS. 1 and 2 and tested experimentally (the results of which will be discussed shortly). Although a single transducer such as 30 or 40 may be used, it is desirable to employ two orthogonally oriented transducers since this provides additional information about the vibrations. Moreover, although the structure of the transducer assembly illustrated in FIG. 3 is preferred, it is possible to employ other configurations, such as, for example, by disposing the two transducers 30 and 40 side by side or by employing arrays of transducers disposed on surface 16 of the membrane. Also, different types of transducers as well as different materials for membrane 12 may be employed. For high temperature applications or for corrosive environments, for example, membrane 12 may be formed of a suitable high temperature or corrosion-resistant material, and transducer assembly 14 may comprise optical transducers. As will be appreciated, sensor 10 is quite rugged and quite inexpensive to construct.

Figure 4:
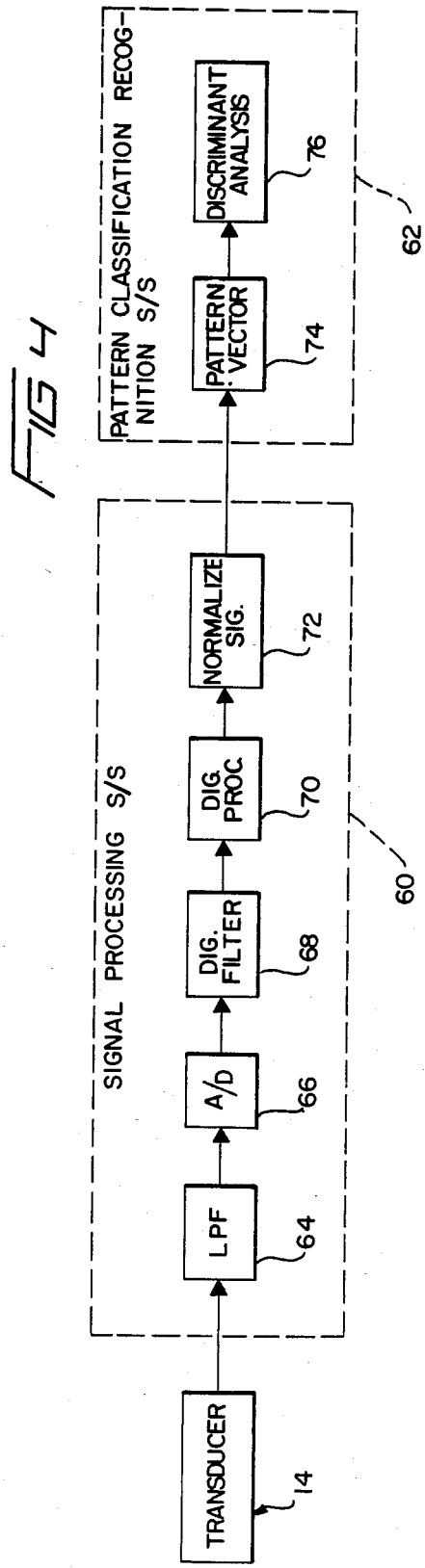
FIG. 4 is a block diagram of a sensor system in accordance with the invention.

FIG. 4 is a block diagram of a sensing system in accordance with the invention for use with an induced vibration dynamic touch sensor 10, such as illustrated in FIGS. 1-3. As shown, the system generally comprises a signal processing subsystem 60 and a pattern classification/recognition subsystem 62. The signal processing subsystem converts the signals produced by sensor 10 into normalized spectral signatures or patterns representative of the character of the object being sensed, and the pattern classification/recognition subsystem analyzes the normalized signatures to classify and recognize the object and its features. The signals from the processing subsystem comprise power or energy density spectra which are analyzed on the basis of their spectral or frequency content, and recognition is principally a problem of discrimination to classify correctly an observed pattern into one of a plurality of known groups. Accordingly, the system is first "taught" the different groups during a phase which establishes a standard pattern vector, or template, from a set of observations of known objects. Thereafter, an observed pattern is classified into a group with the closest fitting template. While many different techniques are available for analyzing and classifying spectral signatures, a preferred classification technique is discriminant analysis, which is a well-known statistical analysis technique that is commonly employed for spectral signature recognition as, for example, in speech recognition systems. The discriminant function employed by the invention is preferably linear and of the form $$z_i = a_{i0} + a_{i1}x_1 + a_{i2}x_2 + \ldots + a_{in}x_n.$$

where $z_i$ is the classification score for group i, the x's are n pattern variables, each representing the area under the spectral density curve in a specified frequency band, and the a's are weighting coefficients which maximize the separability between the groups. Once the weighting coefficients have been determined, each observation is assigned membership into the group that produces the highest score.

Signal processing subsystem 60 converts the analog signals produced by the tranducers of sensor 10 into normalized digital spectral signatures which are analyzed by the pattern classification/recognition subsystem 62 to classify the signatures into the groups in accordance with the characteristics of the objects being sensed. The signal processing subsystem first filters the signals from a transducer in a low pass filter 64, and converts the filtered signals to digital signals in an A/D converter 66. The signals are further filtered in a digital filter 68 and supplied to a digital processor 70 to produce a spectral signature. The spectral signatures are normalized at 72 by making the area under the spectral density curve equal to unity for the frequency band of interest, which may be taken to extend from 0-800 Hz, for example. The normalized signatures are then supplied to the pattern classification/recognition subsystem where they may be converted to pattern vectors at 74 by assigning each of a plurality of areas under the spectral density curve within a specified frequency increment, e.g., 25 Hz, to a different pattern variable. For example, breaking the 0-800 Hz frequency band of each signal from the sensor into contiguous 25 Hz frequency increments and assigning the area under the curve in each increment to a different pattern variable produces 32 pattern variables for each transducer signal, or 64 pattern variables for the two transducer signals. The pattern vectors may then be subjected to a discriminant analysis at 76 for analysis and classification, as previously described.

Signal processing subsystem 60 may simply comprise a commercially available digital signal analyzer, such as a Hewlett Packard model 5420A signal analyzer. A processing time of 320 msec. may be used for processing the 0-800 Hz signals. Since the H.P. signal analyzer processes one channel of information at a time, two such 320 msec. periods are required to process the signals from the two transducers. The pattern classification/recognition subsystem 62 may simply comprise a computer embodying a commercially available statistical software package which performs discriminant analysis, such as, for example, a BMDP-7M statistical software package described, for example, in Dixon, W. J., et al, *BMDP Statistical Software*, University of California Press, Berkeley, Calif., 1983. It is desirable to reduce the dimensionality of the pattern vector by selecting a subset of variables based upon their contribution to the discrimination process. The stepwise discriminant analysis of the BMDP software accomplishes this by sequentially adding variables that add the most to the separation of the groups, and continues to add variables that significantly contribute to the discrimination.

The signal processing subsystem and pattern classification/recognition subsystem illustrated in FIG. 4 and described above have the advantage of being easily implemented with readily available components. It will be appreciated, however, that other system configurations and other spectral analysis techniques may also be employed.

A series of experiments was performed using a touch sensor constructed in accordance with FIGS. 1-3 and a system in accordance with FIG. 4 to assess the performance of the invention. In these experiments, the sensor was held stationary and test objects, such as object 28 of FIG. 2, were moved at a constant speed relative to the sensor and in a direction normal to ridges 26. The sensor, mounted in a vertically movable fixture, was lowered to provide a preselected amount of interference, I, as shown in FIG. 2, between ridges 26 and object 28. The energy density spectrum of the signals was limited to the frequency band 0-800 Hz. The measurement period began when the object made contact with the sensor, and lasted for 320 msec. The H.P. signal analyzer calculated the spectrum for one channel, i.e., transducer, at a time, thus requiring two measurement periods to provide complete bi-directional information. Each of the spectra was normalized by dividing by the total energy in the 0-800 Hz band, and the two normalized spectra from each of the two transducers together represented one experimental observation or signature. The pattern vector was formed by assigning the area in each 25 Hz frequency increment of the two spectra to a different pattern variable. Except as noted below, substantially the same procedure was employed for each experiment. The results of the experiments were as follows.

EXPERIMENT NO. 1

The objective of the first experiment was to determine the ability of the invention to discriminate between objects of different shapes and sizes. The test objects comprised three ball bearings having diameters of 5/16, 3/16, and 5/32 inches, respectively, and three cylinders having diameters of 5/16, 3/16, and ⅛ inches, respectively. For each test object, observations were made for three different amounts of interference, I, of approximately 0.02, 0.025, and 0.03 inches. After testing each object at the three different amounts of interference, the next object was tested using the same procedure. After al objects had been tested, the entire test cycle was repeated three more times, thereby producing a total of 72 signatures. The observations were randomly divided into two groups. Approximately, 70% were selected for the design set which was used to build the discriminant function during a learning phase. The remaining observations served as the test set during the classification phase. The results are presented in the following Table 1.

TABLE 1

| | Classification Matrix for Experiment No. 1 - Shapes and Sizes | | | | | | |
|---|---|---|---|---|---|---|---|
| GROUP | PERCENT CORRECT | NUMBER OF CASES CLASSIFIED INTO GROUP - | | | | | |
| | | BB516 | BB316 | BB532 | CYL516 | CYL316 | CYL18 |
| BB516 | 100.0 | 10 | 0 | 0 | 0 | 0 | 0 |
| BB316 | 100.0 | 0 | 8 | 0 | 0 | 0 | 0 |
| BB532 | 87.5 | 0 | 1 | 7 | 0 | 0 | 0 |
| CYL516 | 100.0 | 0 | 0 | 0 | 11 | 0 | 0 |
| CYL316 | 100.0 | 0 | 0 | 0 | 0 | 10 | 0 |
| CYL316 | 100.0 | 0 | 0 | 0 | 0 | 0 | 10 |
| TBB516 | 100.0 | 2 | 0 | 0 | 0 | 0 | 0 |
| TBB316 | 100.0 | 0 | 4 | 0 | 0 | 0 | 0 |
| TBB532 | 100.0 | 0 | 0 | 4 | 0 | 0 | 0 |
| TCYL516 | 100.0 | 0 | 0 | 0 | 1 | 0 | 0 |
| TCLY316 | 100.0 | 0 | 0 | 0 | 0 | 2 | 0 |
| TCYL18 | 100.0 | 0 | 0 | 0 | 0 | 0 | 2 |

The results presented in Table 1 show that 98% of the design set and 100% of the test set of observations were correctly identified. The different interferences were easily accomodated, and only one observation from the total of 72 was misclassified. The group names refer to either ball bearings (BB) or cylinders (CYL) followed by the diameter of the object. The group names preceded by a "T" were the test groups which were not used in the learning phase.

EXPERIMENT NO. 2

The object of this experiment was to test the capability of the invention to discriminate between patterns of features. The test objects for this experiment were groups of ⅛ inch spheres arranged at locations corresponding to the corners of a ¼ inch square to resemble the first seven Braille letters A-G. The same test procedure as Experiment No. 1 was used, except that the amount of interference was held constant at approximately 0.025 inches for all observations. Nine observations were made for each arrangement, approximately 70% of the observations being randomly included in the design set and the remainder being placed in the test set.

TABLE 2

| | Classification Matrix For Experiment No. 2 Patterns of Features | | | | | | | |
|---|---|---|---|---|---|---|---|---|
| GROUP | PERCENT CORRECT | NUMBER OF CASES CLASSIFIED INTO GROUP - | | | | | | |
| | | A | B | C | D | E | F | G |
| A | 100.0 | 7 | 0 | 0 | 0 | 0 | 0 | 0 |
| B | 100.0 | 0 | 6 | 0 | 0 | 0 | 0 | 0 |
| C | 100.0 | 0 | 0 | 6 | 0 | 0 | 0 | 0 |
| D | 100.0 | 0 | 0 | 0 | 7 | 0 | 0 | 0 |
| E | 100.0 | 0 | 0 | 0 | 0 | 8 | 0 | 0 |
| F | 100.0 | 0 | 0 | 0 | 0 | 0 | 8 | 0 |
| G | 100.0 | 0 | 0 | 0 | 0 | 0 | 0 | 5 |
| TA | 100.0 | 2 | 0 | 0 | 0 | 0 | 0 | 0 |
| TB | 100.0 | 0 | 3 | 0 | 0 | 0 | 0 | 0 |
| TC | 100.0 | 0 | 0 | 3 | 0 | 0 | 0 | 0 |
| TD | 100.0 | 0 | 0 | 0 | 2 | 0 | 0 | 0 |
| TE | 100.0 | 0 | 0 | 0 | 0 | 1 | 0 | 0 |
| TF | 100.0 | 0 | 0 | 0 | 0 | 0 | 1 | 0 |
| TG | 100.0 | 0 | 0 | 0 | 0 | 0 | 0 | 4 |

The results show that 100% of the observations in both the design and test sets were correctly identified. The group names refer to the Braille character the arrangement resembles, and the "T" preceding a group name indicates a test set.

EXPERIMENT NO. 3

The object of this experiment was to test the capability of the invention to discriminate between different orientations of features. The feature of interest was the orientation of the slot in the head of a machine screw. The slot was oriented at different angles (0°, 15°, 30°, 60°, 90° and 120°) with respect to the direction of the ridges on the sensor. The test procedure was also similar to the first two experiments. A total of 48 observations, 8 per orientation were obtained from two test cycles. As before, the observations were randomly divided into two groups, the design set (approximately 65%) and the test set (approximately 35%). The results are presented in the following Table 3.

TABLE 3

| | Classification Matrix for Experiment No. 3 - Feature Orientation | | | | | | |
|---|---|---|---|---|---|---|---|
| GROUP | PERCENT CORRECT | NUMBER OF CASES CLASSIFIED INTO GROUP - | | | | | |
| | | SLOT0 | SLOT15 | SLOT30 | SLOT60 | SLOT90 | SLOT120 |
| SLOT0 | 100.0 | 6 | 0 | 0 | 0 | 0 | 0 |
| SLOT15 | 100.0 | 0 | 5 | 0 | 0 | 0 | 0 |
| SLOT30 | 100.0 | 0 | 0 | 7 | 0 | 0 | 0 |
| SLOT60 | 100.0 | 0 | 0 | 0 | 5 | 0 | 0 |
| SLOT90 | 100.0 | 0 | 0 | 0 | 0 | 7 | 0 |
| SLOT120 | 100.0 | 0 | 0 | 0 | 0 | 0 | 6 |
| TSLOT0 | 100.0 | 2 | 0 | 0 | 0 | 0 | 0 |
| TSLOT15 | 100.0 | 0 | 3 | 0 | 0 | 0 | 0 |
| TSLOT30 | 100.0 | 0 | 0 | 1 | 0 | 0 | 0 |

TABLE 3-continued

| | Classification Matrix for Experiment No. 3 - Feature Orientation | | | | | | |
|---|---|---|---|---|---|---|---|
| | PERCENT | NUMBER OF CASES CLASSIFIED INTO GROUP - | | | | | |
| GROUP | CORRECT | SLOT0 | SLOT15 | SLOT30 | SLOT60 | SLOT90 | SLOT120 |
| TSLOT60 | 100.0 | 0 | 0 | 0 | 3 | 0 | 0 |
| TSLOT90 | 100.0 | 0 | 0 | 0 | 0 | 1 | 0 |
| TSLOT120 | 100.0 | 0 | 0 | 0 | 0 | 0 | 2 |

As shown in the Table, 100% of the observations were correctly identified. The group names refer to slot orientation, and those preceded by the "T" indicate test groups.

EXPERIMENT NO. 4

The object of this experiment was to test the ability of the invention to discriminate between relative feature positions. The test objects comprised two ⅛ inch ball bearings spaced 0.25, 0.26, or 0.35 inches apart. Thus, the relative change in position was between 0.01 and 0.1 inches. Three sets of objects were used to ensure that the signature variability was caused by the change in feature position. The test procedure for obtaining the individual signatures was the same as previously described, except that only one test cycle comprising four observations was performed for each test object. Thus, there was a total of 36 observations, or 12 for each position. The results of this experiment are presented in Table 4.

TABLE 4

| | Classification Matrix for Experiment No. 4 - Relative Feature Position | | | |
|---|---|---|---|---|
| | PERCENT | NUMBER OF CASES CLASSIFIED INTO GROUP - | | |
| GROUP | CORRECT | L250 | L260 | L350 |
| L250 | 100.0 | 8 | 0 | 0 |
| L260 | 100.0 | 0 | 8 | 0 |
| L350 | 100.0 | 0 | 0 | 8 |
| TL250 | 100.0 | 4 | 0 | 0 |
| TL260 | 100.0 | 0 | 4 | 0 |
| TL350 | 100.0 | 0 | 0 | 4 |

The group names in the Table correspond to the distance between the ball bearings in thousandths of an inch, and the Table shows that 100% of the observations were correctly classified. Significantly, this experiment demonstrates the ability of the invention to accurately discriminate differences in relative position as small as 0.01 inches.

EXPERIMENT NO. 5

The purpose of this experiment was to determine the effect that different speeds had on the classification ability of the invention. For this experiment, a subset of the objects tested in Experiment No. 4 was employed and the speed was increased by a factor of 1.35. For this experiment, the bandwidth of interest was also increased by the same factor to 0-1080 Hz, and the frequency increment corresponding to each pattern variable was also increased by the same factor to 33.75 Hz. Two observations were made for each test arrangement. The sample set was combined with the observations of Experiment No. 4 to form a design set. The results are presented in Table 5.

TABLE 5

| | Jackknifed Classification for Experiment No. 5 - Changes in Speed | | | |
|---|---|---|---|---|
| | PERCENT | NUMBER OF CASES CLASSIFIED INTO GROUP- | | |
| GROUP | CORRECT | L250 | L260 | L350 |
| L250 | 100.0 | 14 | 0 | 0 |
| L260 | 100.0 | 0 | 14 | 0 |
| L350 | 100.0 | 0 | 0 | 14 |
| TOTAL | 100.0 | 14 | 14 | 14 |

As shown, 100% of the observations were correctly identified.

EXPERIMENT NO. 6

This experiment tested the ability of the invention to discriminate between different surface textures. The objects employed for this experiment comprised six different grits of sand paper (grit Nos. 36, 60, 80, 100, 180 and 220). Only 79.2% of the observations were correctly classified, and misclassifications occurred in every group. The results were complicated to some extent by deterioration of the skin surface as a result of prolonged contact with the abrasive sand paper surface. Consequently, a bias was created and the results were somewhat dependent on the number of prior observations which had been gathered. If the groups were aggregated into broader classes, such as coarse, medium and fine, the success rate would be much higher, as shown in the folowing Table 6.

TABLE 6

| | Jackknifed Classification for Experiment No. 6 - Surface Texture/Roughness. | | | | | | |
|---|---|---|---|---|---|---|---|
| | PERCENT CORRECT | NUMBER OF CASES CLASSIFIED INTO GROUP- | | | | | |
| GROUP | | SP36 | SP60 | SP80 | SP100 | SP180 | SP220 |
| SP36 | 85.0 | 17 | 3 | 0 | 0 | 0 | 0 |
| SP60 | 85.0 | 0 | 17 | 1 | 2 | 0 | 0 |
| SP80 | 65.0 | 2 | 3 | 13 | 2 | 0 | 0 |
| SP100 | 85.0 | 0 | 3 | 0 | 17 | 0 | 0 |
| SP180 | 90.0 | 0 | 0 | 0 | 0 | 18 | 2 |
| SP220 | 65.0 | 0 | 0 | 0 | 0 | 7 | 13 |
| TOTAL | 79.2 | 19 | 26 | 14 | 21 | 25 | 15 |

To determine how repeatable the results obtained were, a second prototype sensor configured as the first was used in a limited experiment to test the same subset of objects from Experiment No. 4 which were tested in Experiment No. 5. One test cycle with two observations per object was performed, and 100% of the observations were correctly identified.

The foregoing experiments demonstrate that the invention possesses rather powerful capabilities, in spite of its relative simplicity. The experiments demonstrate that the invention has the capability of discriminating between objects which differ in diameter by as little as 1/32 inches, and can discriminate between objects having features spaced as little as 0.01 inches apart. The sensor shown in FIGS. 1-3, employing a rather simple pattern of prismatic ridges, is directional in that the vibrations induced in the sensor membrane will be different for different directions of relative movements between the sensor and a given object. Such directionality can be reduced by employing different patterns of protrusions, e.g., random protrusions, on the sensor membrane to improve tactile accuity. Moreover, different skin materials, including composites, may be employed to render the sensor more suitable for certain applications, such as in corrosive or high temperature environments. Furthermore, other types of transducers such as piezoceramics, strain gages, or optical sensors may be employed, as well as different types of signal processing techniques and algorithms.

Various applications which may be envisioned for sensors in accordance with the invention include edge following applications, search applications in underwater or other environments where optical sensing is limited, bin-picking applications to select components from a bin based upon their size, shape or surface features, as well as various types of inspection tasks, to name a few.

While a preferred embodiment of the invention has been shown and described, it will be appreciated by those skilled in the art that changes may be made in this embodiment without departing from the principles and spirit of the invention, the scope of which is defined in the appended claims.

We claim:

1. Sensor apparatus comprising a membrane having a plurality of protrusions on a surface thereof; means for producing sliding contact between the membrane surface and an object to induce vibrations in the membrane; transducer means for sensing the vibrations and for producing an electrical signal corresponding to the vibrations; and means for deriving from the electrical signal a pattern characteristic of a surface area of the object contacted by the membrane, and wherein said membrane and said transducer means are commonly supported, and said membrane is supported at peripheral portions such that most of said membrane may vibrate unobstructedly.

2. The apparatus of claim 1 further comprising means responsive to the pattern for identifying the object.

3. The apparatus of claim 2, wherein the identifying means comprises means for comparing the pattern to stored patterns of known objects.

4. The apparatus of claim 1, wherein the pattern comprises a multiple variable pattern vector characteristic of the object.

5. The apparatus of claim 4, wherein said electrical signal comprises a spectral density signature corresponding to the vibrations, and each variable of the pattern vector corresponds to the energy contained in the signature in a different frequency increment.

6. The apparatus of claim 5, wherein said deriving means comprises means for performing a discriminant analysis on the pattern vector.

7. The apparatus of claim 6, wherein said performing means comprises a computer.

8. The apparatus of claim 1, wherein said transducer means comprises means for sensing vibrations primarily in a predetermined direction.

9. The apparatus of claim 1, wherein the transducer means comprises first and second transducers, each having a greater sensitivity to vibrations in a predetermined direction than in other directions, and wherein the first and second transducers are oriented with respect to one another such that their directions of maximum sensitivity extend in different directions.

10. The apparatus of claim 9, wherein the first transducer is affixed to the membrane, and the second transducer is affixed to the first transducer, and wherein each transducer produces an electrical signal.

11. The apparatus of claim 8, wherein said transducers comprise piezoelectric polymers of PVDF.

12. The apparatus of claim 1, wherein said protrusions comprise regularly spaced parallel ridges.

13. The apparatus of claim 1, wherein said membrane comprises silicone rubber.

14. Sensor apparatus comprising a membrane having a plurality of protrusions on a first surface thereof; means for producing sliding contact between the membrane first surface and an object to induce vibrations in the membrane; and first and second transducers, each transducer comprising a thin film of uniaxially oriented piezoelectric material having a greater sensitivity to strains applied in one direction than in other directions, the first and second transducers being disposed on a second surface of the membrane opposite from the first surface of the membrane such that the directions of maximum sensitivity of the two transducers extend in different directions, and such that each transducer produces an electrical signal corresponding to vibrations applied to the transducer, the electrical signal being characteristic of a surface area of contact between the membrane and the object in the direction of maximum sensitivity of the transducer.

15. The sensor apparatus of claim 14, wherein the membrane is mounted on a plate having a centrally disposed aperture therein such that the membrane covers the aperture and is supported by the plate at the peripheral edges of the membrane.

16. The apparatus of claim 14, wherein said protrusions comprise a plurality of regular, prism-shaped ridges.

17. The apparatus of claim 14, wherein said membrane comprises silicone rubber.

18. The apparatus of claim 14, wherein said piezoelectric material comprises PVDF.

19. A sensing method comprising producing sliding contact between a membrane having protrusions thereon and an object so as to induce vibrations in the membrane; sensing the vibrations by a transducer means further from the object than the membrane is and producing an electrical signal corresponding to the vibrations; and deriving from the electrical signal a pattern characteristic of a surface area of the object contacted by the membrane to determine unknown characteristics of the surface area.

20. The method of claim 19, wherein said sensing comprises sensing the vibrations in first and second directions and producing first and second electrical signals corresponding thereto.

21. The method of claim 20, wherein said first and second electrical signals comprise a spectral signature corresponding to the character of the object, and wherein said deriving comprises producing a multiple variable pattern vector from said spectral signature.

22. The method of claim 21, wherein said deriving comprises subjecting said pattern vector to a discriminant analysis, and identifying the character of the object by assigning the pattern vector to one of a plurality of groups having known pattern vectors, said assigning comprising selecting a group having a known pattern vector that best matches the pattern vector of the object.

23. The apparatus of claim 1 wherein said transducer means is mounted such that it is further away from the object than the membrane is.

24. The apparatus of claim 1 wherein said transducer means is mounted to a surface of said membrane opposite said surface having the plurality of protrusions.

25. The method of claim 19 wherein the step of sensing the vibrations is accomplished by a transducer means mounted to a surface of the membrane opposite the protrusions.

* * * * *